United States Patent
Wojtkowski, Jr. et al.

(10) Patent No.: US 6,468,194 B2
(45) Date of Patent: Oct. 22, 2002

(54) SLEEVE FOR ROLLING MILL OIL FILM BEARING

(75) Inventors: Thomas C. Wojtkowski, Jr., Shrewsbury, MA (US); Peter N. Osgood, Upton, MA (US); Earl S. Winslow, Grafton, MA (US)

(73) Assignee: Morgan Construction Company, Worcester, MA (US)

( * ) Notice: Subject to any disclaimer, the term of this patent is extended or adjusted under 35 U.S.C. 154(b) by 45 days.

(21) Appl. No.: 09/732,959

(22) Filed: Dec. 8, 2000

(65) Prior Publication Data

US 2002/0103062 A1 Aug. 1, 2002

(51) Int. Cl.$^7$ .............................. B21B 27/02; B25F 5/02
(52) U.S. Cl. .................... 492/47; 384/281; 29/898.054; 492/1
(58) Field of Search ............................... 492/48, 1, 47, 492/45; 29/898, 898.054; 384/276, 281, 280

(56) References Cited

U.S. PATENT DOCUMENTS

| | | | |
|---|---|---|---|
| 2,543,154 A | | 2/1951 | Cox |
| 2,905,511 A | | 9/1959 | Cerness |
| 3,453,031 A | * | 7/1969 | Rickley et al. ............. 384/118 |
| 4,073,550 A | | 2/1978 | Yahraus |
| 4,093,321 A | | 6/1978 | Ikariishi et al. |
| 4,159,152 A | * | 6/1979 | Bjork .......................... 384/291 |
| 4,249,993 A | | 2/1981 | Stegelitz et al. |
| 4,336,006 A | | 6/1982 | Grabow et al. |
| 4,351,576 A | | 9/1982 | Nishide et al. |
| 4,372,626 A | | 2/1983 | Petros |
| 4,384,748 A | | 5/1983 | Naoi et al. |
| 4,459,048 A | | 7/1984 | Stachuletz |
| 4,605,363 A | | 8/1986 | Walsh |
| 4,836,758 A | | 6/1989 | Elson et al. |
| 4,889,435 A | | 12/1989 | Gojon |
| 4,938,615 A | | 7/1990 | Baker |
| 4,995,735 A | | 2/1991 | Dansdill |
| 5,029,461 A | | 7/1991 | Lawrence et al. |
| 5,048,168 A | * | 9/1991 | Vanaschen et al. ........... 492/47 |
| 5,136,766 A | * | 8/1992 | Savitz ............................ 492/1 |
| 5,575,572 A | | 11/1996 | Schaede |
| 5,707,155 A | | 1/1998 | Banfield et al. |
| 5,927,862 A | * | 7/1999 | Debnam et al. ............. 384/439 |
| 6,015,236 A | * | 1/2000 | Niegel et al. ................ 384/276 |
| 6,149,309 A | * | 11/2000 | Wojtkowski et al. ....... 384/276 |

* cited by examiner

Primary Examiner—S. Thomas Hughes
Assistant Examiner—Marc Jimenez
(74) Attorney, Agent, or Firm—Samuels, Gauthier & Stevens, LLP

(57) ABSTRACT

A sleeve is disclosed for use in an oil film bearing of the type employed to rotatably support a roll neck in a rolling mill. The sleeve has an internally tapered section, an end section aligned axially with the internally tapered section, and a cylindrical outer surface surrounding the internally tapered section. The cylindrical outer surface is adapted to be rotatably journalled in a bushing component of the bearing and has a diameter D of at least 500 mm. The internally tapered section is adapted to be seated on an externally tapered section of the roll neck and has a taper angle greater than three degrees and a minimum thickness of between about 10 mm and 0.024D+14.5. Keyways located outside of the internally tapered section and exclusively in the end section serve to rotatably fix the sleeve to the roll neck.

5 Claims, 4 Drawing Sheets

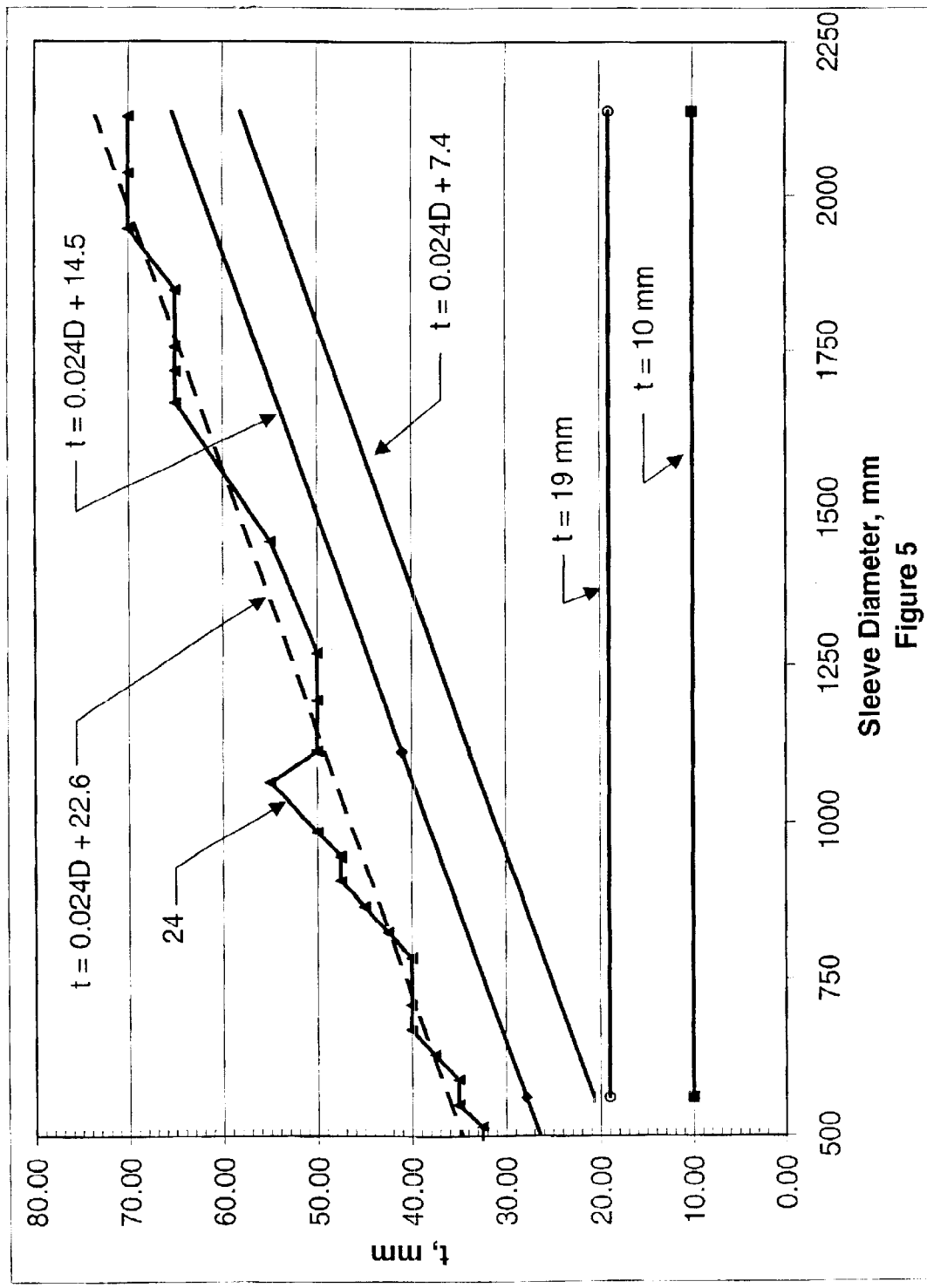

SLEEVE FOR ROLLING MILL OIL FILM BEARING

BACKGROUND

1. Field of the Invention

This invention relates to oil film bearings of the type employed to rotatably support the necks of rolls in rolling mills.

2. Background Discussion

A rolling mill oil film bearing typically comprises a sleeve axially received on and rotatably fixed to a roll neck. The sleeve is surrounded by a bushing contained in a chock mounted in a roll housing. In service, the sleeve is rotatably supported on a thin film of oil hydrodynamically maintained at the bearing load zone between the sleeve and the bushing.

The sleeves may be either internally cylindrical for use on cylindrical or "straight" roll necks, or they may be internally tapered for use on tapered roll necks. Moreover, the sleeves may be "self locking" or "non-locking". Self locking sleeves are frictionally fixed to the roll necks by interference fits, whereas non-locking sleeves require keys or the like to effect a mechanical interengagement with the roll necks.

The present invention is concerned with an improvement to internally tapered sleeves having relatively large journal diameters of at least 500 mm and non-locking taper angles of at least three degrees.

With reference to FIG. 1, one such sleeve is shown at 10 as a component part of a rolling mill oil film bearing 12. The sleeve 10 is removably received on a tapered section 16 of the roll neck and is rotatably fixed to the roll neck by keys 14 or the like. The sleeve is surrounded by a bushing 18 and fixed in a bearing chock 20. In service, as previously noted, the sleeve is rotatably supported on a thin film of oil (not shown) hydrodynamically maintained at the bearing load zone between the sleeve and the bushing.

With reference to FIG. 2, it will be seen that the sleeve 10 has an internally tapered section 21 with a length L, an end section 22 extending axially beyond the outboard end of the internally tapered section, and a cylindrical outer surface 23 surrounding the internally tapered section. The cylindrical outer surface has a diameter D (also commonly referred to as the "journal" diameter). The internally tapered section has a taper angle $\alpha$, a minimum thickness t at its inboard end, and a maximum thickness t' at its outboard end adjacent to the end section 22. Keyways 15 coact in mechanical interengagement with the keys 14, with both the keys and the keyways being located outside of the internally tapered section 21 and exclusively within the end section 22.

The journal diameter D and length L of the internally tapered section 21 govern the size and load bearing capacity of the bearing. The taper angle $\alpha$ will dictate whether the sleeve is self locking or non-locking.

When this type of oil film bearing was first introduced to rolling mills in the 1930's, those skilled in the art deemed it essential that the sleeve wall at the load zone have a minimum thickness t sufficient to withstand elastic deformation of the sleeve under load conditions, and also to accommodate a maximum thickness t' sufficient to resist damage at the keyways due to torque induced stresses. Thus, as depicted by the plot line 24 in FIG. 5, for sleeves having journal diameters ranging from 500–2100 mm, minimum thicknesses t typically ranged from 30 to 70 mm, with the average being t=0.024 D+22.6 as represented by the broken plot line.

This design criteria remained virtually unchanged until the mid 1970's, when, as disclosed in U.S. Pat. No. 4,093,321, those skilled in the art identified the interruption of the internally tapered section by the keyways as a cause of dimensional irregularities in the products being rolled. In order to correct this problem, the keys and keyways were moved out of the internally tapered section 21 to their present positions located exclusively in the end section 22, as shown in FIGS. 1 and 2. Although this obviated any necessity to maintain an increased thickness t' at the outboard end of the internally tapered section, sleeve thicknesses remained unchanged due to the continuing belief on the part of those skilled in the art that load induced elastic sleeve deformation was detrimental and to be avoided at all costs.

SUMMARY OF THE INVENTION

It has now been discovered, however, that contrary to conventional wisdom, a certain amount of elastic sleeve deformation is not only tolerable, but desirable in that it results in an increase in the surface area of the sleeve supported on the oil film at the bearing load zone. This in turn increases the load bearing capacity of the bearing. Thus, for a given journal diameter D and taper angle $\alpha$, a beneficial magnitude of elastic deformation can be introduced by reducing the minimum thickness t, which for a given length L and taper angle $\alpha$, results in a reduction in thickness of the sleeve throughout the length of the internally tapered section. Preferably, the reduction in thickness t is achieved by increasing the bore size of the sleeve while maintaining the journal diameter D constant. This enables the sleeve to accommodate a larger roll neck, thereby further strengthening the overall assembly.

A principal objective of the present invention is to increase the load bearing capacity of relatively large oil film bearings having internally tapered non-locking sleeves by at least 10%, and preferably by as much as 20% or more through appropriate reductions in the minimum sleeve thicknesses t.

A companion objective of the present invention is to reduce the size and weight of the metal forgings or castings from which the sleeves are machined, thereby beneficially reducing raw material costs.

These and other objectives, advantages and features of the present invention will now be described in greater detail with continued reference to the accompanying drawings, wherein:

BRIEF DESCRIPTION OF THE DRAWINGS

FIG. 5 is a graph depicting the t/D relationships for conventional sleeves and sleeves modified in accordance with the present invention.

DETAILED DESCRIPTION OF PREFERRED EMBODIMENTS

Figure 1:
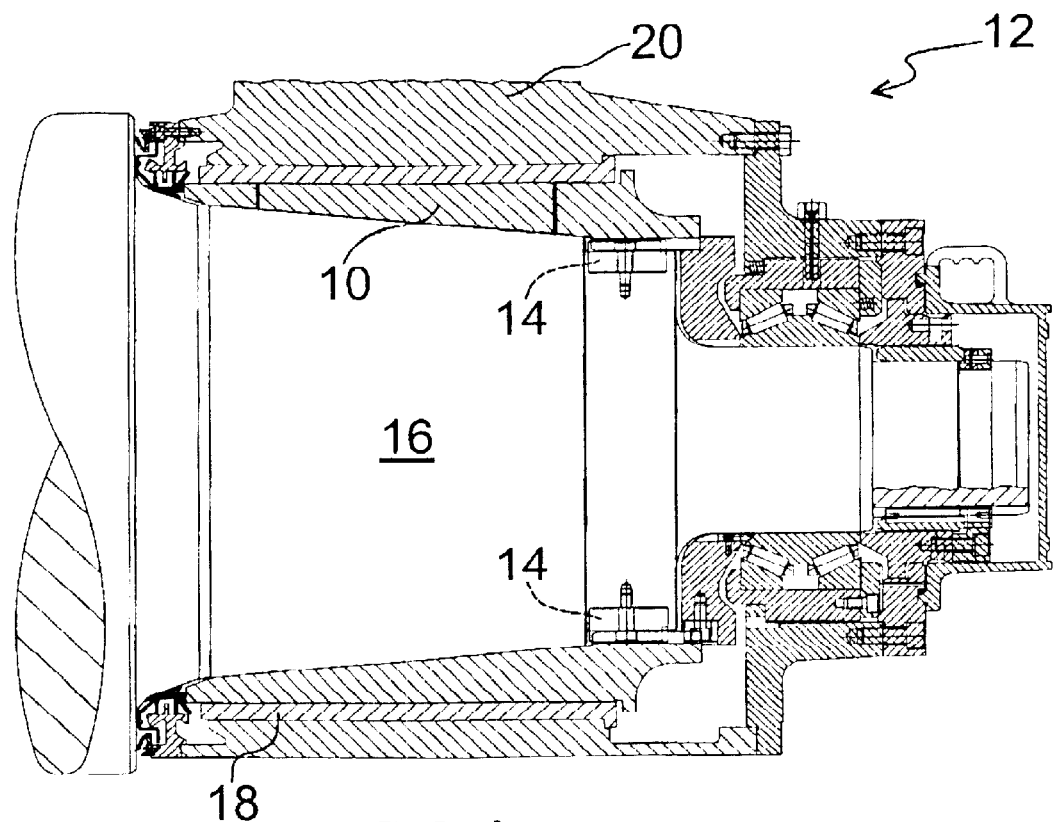
FIG. 1 is a schematic illustration of an oil film bearing assembly of the type employed in rolling mills to rotatably support the necks of rolls.
Figure 2:
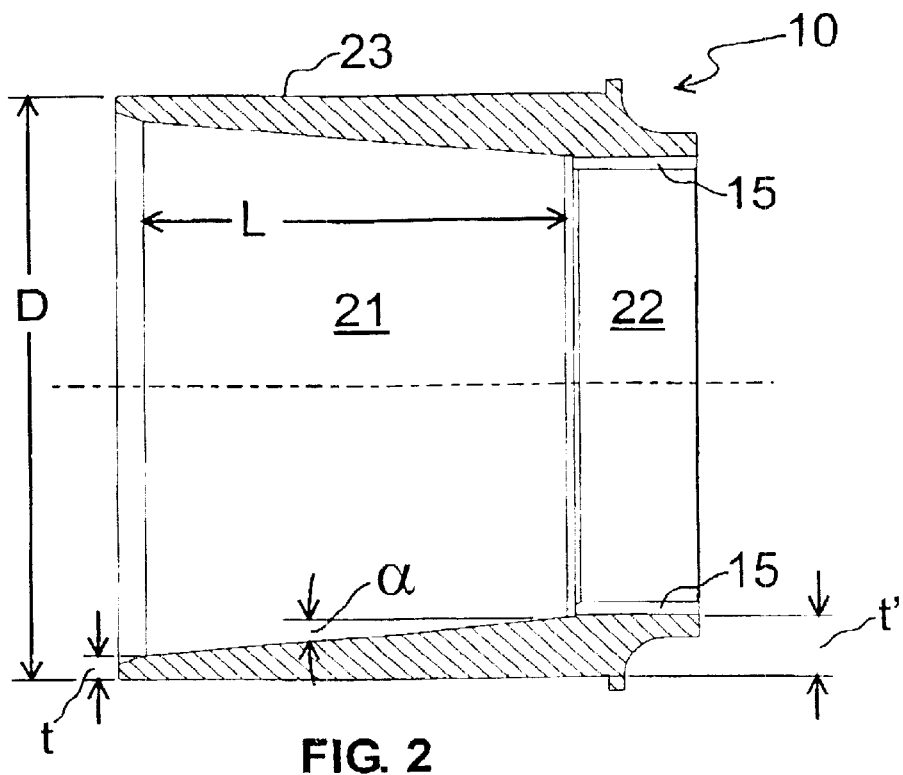
FIG. 2 is a longitudinal sectional view on an enlarged scale of the internally tapered non-locking sleeve shown in FIG. 1.
Figure 3A:
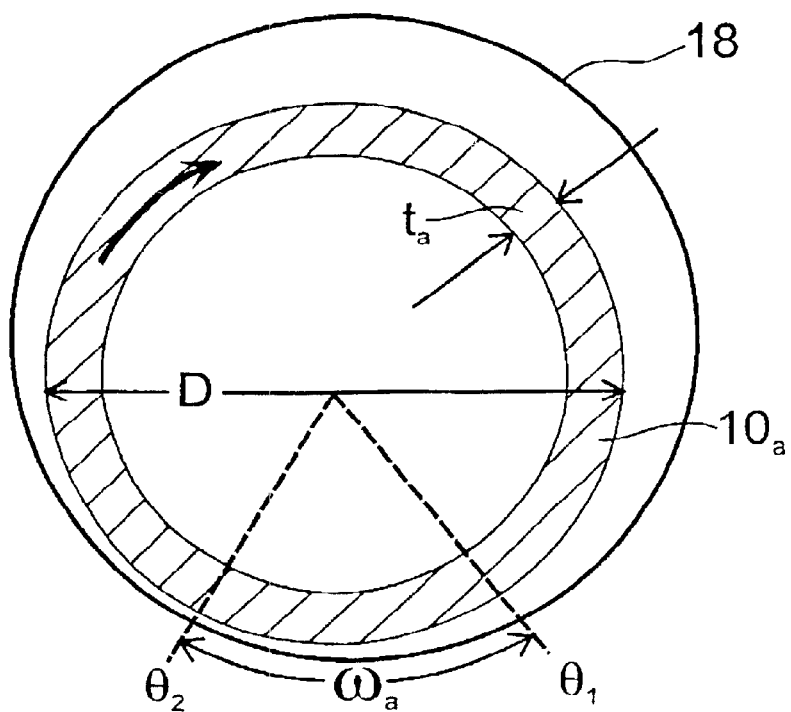
FIG. 3A diagrammatically illustrates the width of the load zone when a conventional internally tapered non-locking sleeve is rotating under load.
Figure 4:
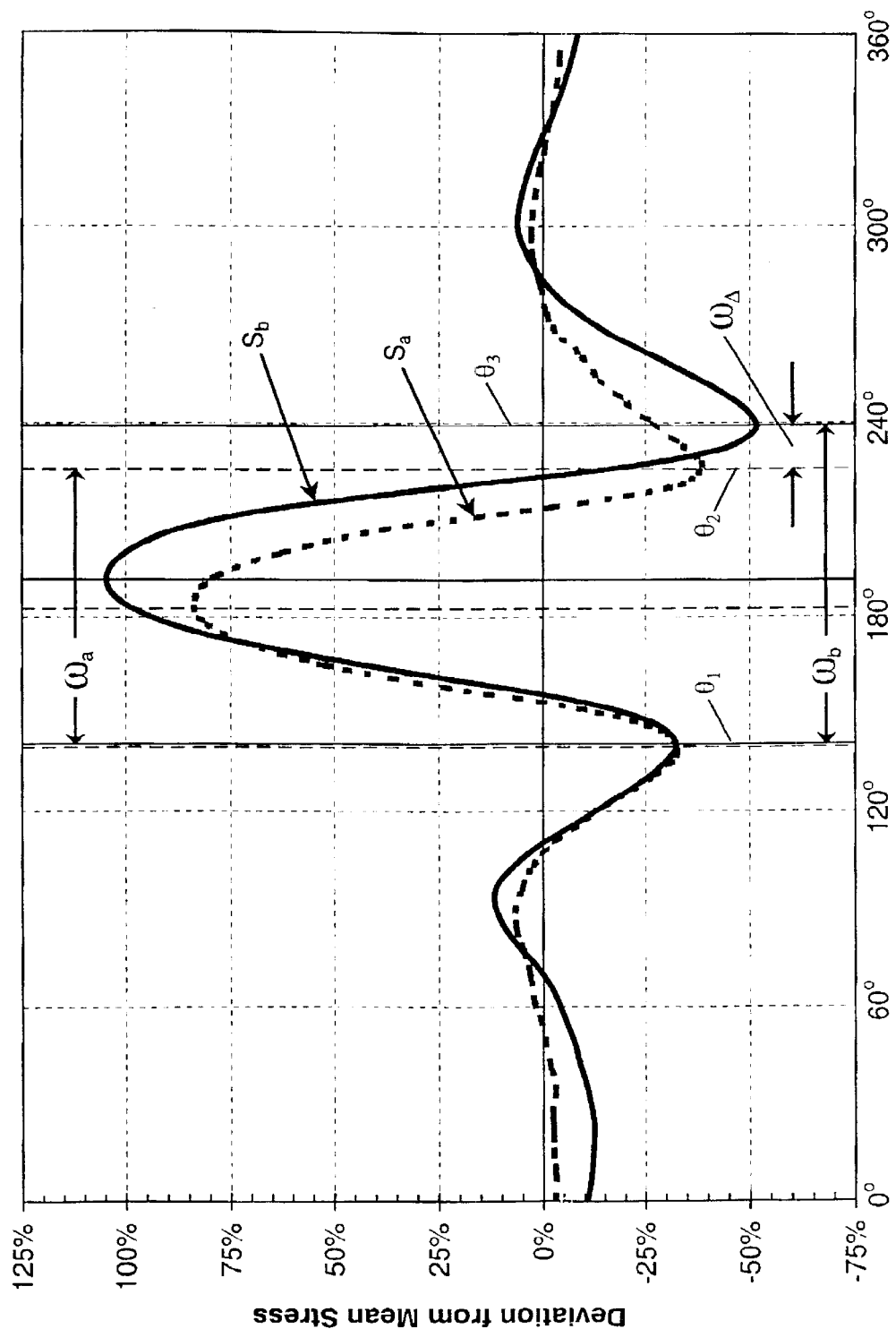
FIG. 4 is a graph comparing the sleeve centerline circumferential stresses of the sleeves shown in FIGS. 3A and 3B.

In FIG. 3A, where dimensions have been exaggerated for purposes of illustrations, a sleeve 10a with a journal diameter D and a thickness $t_a$ is shown rotating in a clockwise direction under load within a bushing 18. The resulting centerline circumferential stress on sleeve 10a at the internally tapered section 21 is depicted by curve $S_a$ in FIG. 4. Maximum deviation from mean stress begins at $\theta_1$ and rises to a maximum before dropping back to a minimum at $\theta_2$. The circumferential distance $w_a$ between $\theta_1$ and $\theta_2$ is representative of the width of the load zone, where the sleeve is supported on the hydrodynamically maintained film of oil.

Figure 3B:
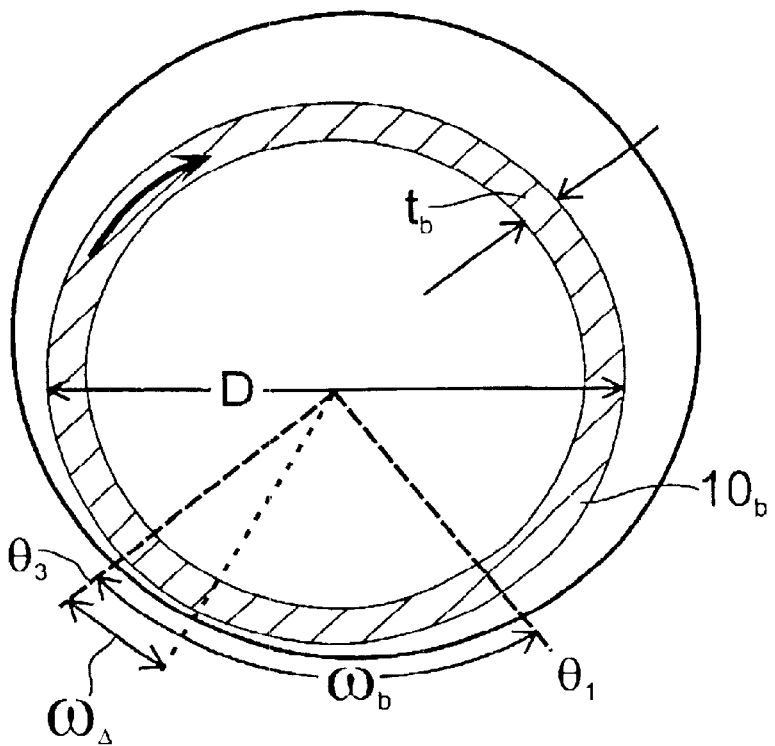
FIG. 3B is a view similar to FIG. 3A diagrammatically illustrating the increase in the width of the load zone resulting from a decrease in sleeve thickness t, all other conditions being equal.

In FIG. 3B, a sleeve 10b with the same journal diameter D but with a reduced thickness $t_b$ is shown operating under the same load conditions. The reduced thickness $t_b$ allows the sleeve more freedom to elastically deform under load, with a resulting centerline circumferential stress depicted by curve $S_b$ in FIG. 4.

It will be seen that maximum deviation from mean stress for curve $S_b$ again begins at $\theta_1$, and after rising to a maximum, drops back to a minimum at $\theta_3$. The circumferential distance $w_b$ exceeds $w_a$ by $w_\Delta$, with $w_\Delta$ being the result of increased elastic sleeve deformation due to the decrease in sleeve thickness from $t_a$ to $t_b$. Since the length L of the internally tapered section 21 is the same for both sleeves, the percentage increase in load zone area may be calculated as $w_\Delta/w_a \times 100$.

In accordance with the present invention, and with reference to FIG. 5, it has now been determined that as compared to bearings incorporating conventionally dimensioned sleeves with average minimum thicknesses t of 0.024D+22.6, increases in load bearing capacity of about 10% to 20% and higher can be achieved by reducing the minimum thicknesses t to a range of between about 10 mm to 0.024D+14.5, and preferably to between about 19 mm to 0.024D+7.4.

Minimum thicknesses t of 10 mm and preferably 19 mm insure that the sleeves have sufficient structural rigidity to resist deformation by the relatively modest forces exerted during the machining processes employed to convert forged or cast shells into the finished products. However, once the sleeves are mounted on the roll necks, deformation under higher rolling loads beneficially increases the area of the sleeves supported at the load zone.

We claim:

1. A sleeve for use in an oil film bearing of the type employed to rotatably support a roll neck in a rolling mill, said sleeve having a cylindrical outer surface surrounding an internally tapered section, said cylindrical outer surface being adapted to be rotatably supported on a film of oil at a load zone of the bearing and said internally tapered section extending axially across said load zone and being adapted to be seated on an externally tapered section of the roll neck, said cylindrical outer surface having a diameter D of at least 500 mm, and said internally tapered section having a taper angle greater than three degrees and a minimum thickness of between about 10 mm and 0.024D+14.5.

2. The sleeve as claimed in claim 1 where said minimum thickness is at least 19 mm.

3. The sleeve as claimed in claim 2 wherein said minimum thickness is not greater than 0.024D+7.4.

4. A sleeve for use in an oil film bearing of the type employed to rotatably support a roll neck in a rolling mill, said sleeve having a first internally tapered section at one end, and a second internally tapered section extending from said first internally tapered section to an opposite end section aligned axially with said first and second internally tapered sections, and a cylindrical outer surface surrounding said second internally tapered section, said cylindrical outer surface being adapted to be rotatably journalled in a bushing component of the bearing and having a diameter D of at least 500 mm, said second internally tapered section being adapted to be seated on an externally tapered section of the roll neck and having a taper angle greater than three degrees and a minimum thickness of between about 10 mm and 0.024D+14.5, and mechanically engageable means located outside of said second internally tapered section and exclusively in the said opposite end section for rotatably fixing said sleeve to the roll neck.

5. A sleeve for use in an oil film bearing of the type employed to rotatably support a roll neck in a rolling mill, said sleeve having a cylindrical outer surface surrounding an internally tapered section, said internally tapered section being bordered at one end by an axially aligned end section incorporating mechanically engageable means for rotatably fixing said sleeve to the roll neck, said cylindrical outer surface being adapted to be rotatably journalled in a bushing component of the bearing and having a diameter D of at least 500 mm, and said internally tapered section being adapted to be seated on an externally tapered section of the roll neck and having a taper angle greater than three degrees and a minimum thickness of between about 10 mm and 0.024D+14.5.

* * * * *